US007029018B2

(12) United States Patent
Leon

(10) Patent No.: US 7,029,018 B2
(45) Date of Patent: Apr. 18, 2006

(54) BICYCLE TRANSPORTER

(76) Inventor: Michael Anthony Leon, 1135 Edgewood Ranch Rd, Orlando, FL (US) 32835

(*) Notice: Subject to any disclaimer, the term of this patent is extended or adjusted under 35 U.S.C. 154(b) by 0 days.

(21) Appl. No.: 10/774,996

(22) Filed: Feb. 9, 2004

(65) Prior Publication Data

US 2004/0155428 A1 Aug. 12, 2004

Related U.S. Application Data

(63) Continuation-in-part of application No. 10/104,435, filed on Mar. 22, 2002, now Pat. No. 6,688,622.

(51) Int. Cl.
*B66K 27/00* (2006.01)
(52) U.S. Cl. ..................... 280/204; 280/402
(58) Field of Classification Search ................ 280/204, 280/402, 480
See application file for complete search history.

(56) References Cited

U.S. PATENT DOCUMENTS

| | | | | |
|---|---|---|---|---|
| 4,721,320 A | * | 1/1988 | Creps et al. | 280/204 |
| 5,076,599 A | * | 12/1991 | Lockett et al. | 280/204 |
| 5,454,578 A | * | 10/1995 | Neack | 280/204 |
| 5,577,746 A | * | 11/1996 | Britton | 280/204 |
| 5,599,033 A | * | 2/1997 | Kolbus et al. | 280/204 |
| 5,669,618 A | * | 9/1997 | Chiu | 280/204 |
| 5,829,771 A | * | 11/1998 | Hsu | 280/204 |
| 6,193,252 B1 | * | 2/2001 | Lin | 280/204 |
| 6,196,572 B1 | * | 3/2001 | Durrin | 280/648 |
| 2001/0002745 A1 | * | 6/2001 | Weber | 280/62 |

* cited by examiner

*Primary Examiner*—Kevin Hurley
(74) *Attorney, Agent, or Firm*—Harry I. Leon; Vivian L. Steadman

(57) ABSTRACT

An apparatus for towing up to two bicycles with another bicycle when the first bicycle is also towing a baby jogging cart or, alternately, a bicycle trailer or trail-a-bike. Particularly useful for exercising a child (or two children) and allowing her to ride a bike until tired, and then towing the child's bike while she rests in the jogging cart, the apparatus comprises a bracket assembly which is removably mounted on the rear wheel support structure of the towing bicycle. The bracket assembly comprises a hitch pin which is removably attached by a flexible connector to a towing arm. The latter is connected to the front of the jogging cart and its undercarriage. Prior to towing the child's or children's bicycle(s), one turns its front wheel approximately 90 degrees. There are provided two locations for mounting the bicycles: the first one being disposed between the rear axle and the back of the jogging cart's seat and the other, which is defined by a wheel carrier, being disposed behind the rear axle of the jogging cart. Straps hold the wheels of the towed bicycles and their handlebars to the jogging cart's axle and handle, respectively. In this position, handlebar stem bearings allow the towed bicycle to easily track behind the jogging cart. Further, when towed, the bicycles lean outwardly during turns; and their rear wheels are free to move over unevenness in the road, thus providing ease of handling for the towing bicyclist.

8 Claims, 8 Drawing Sheets

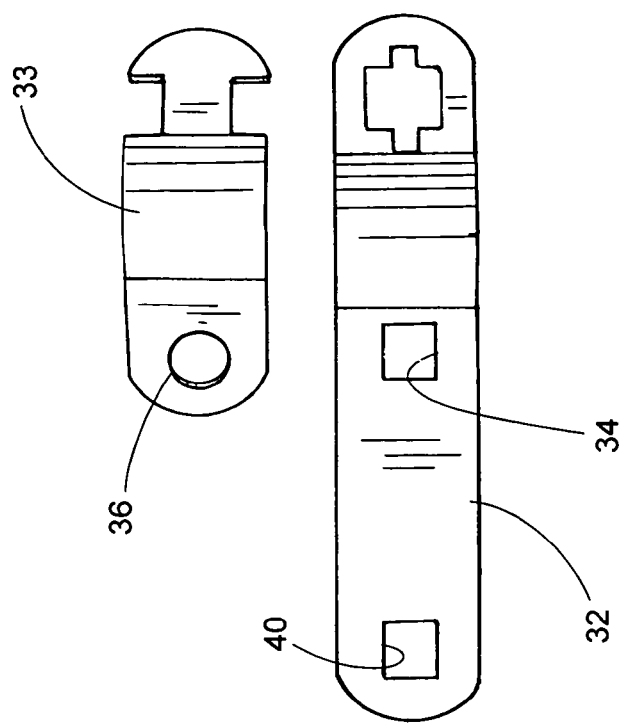
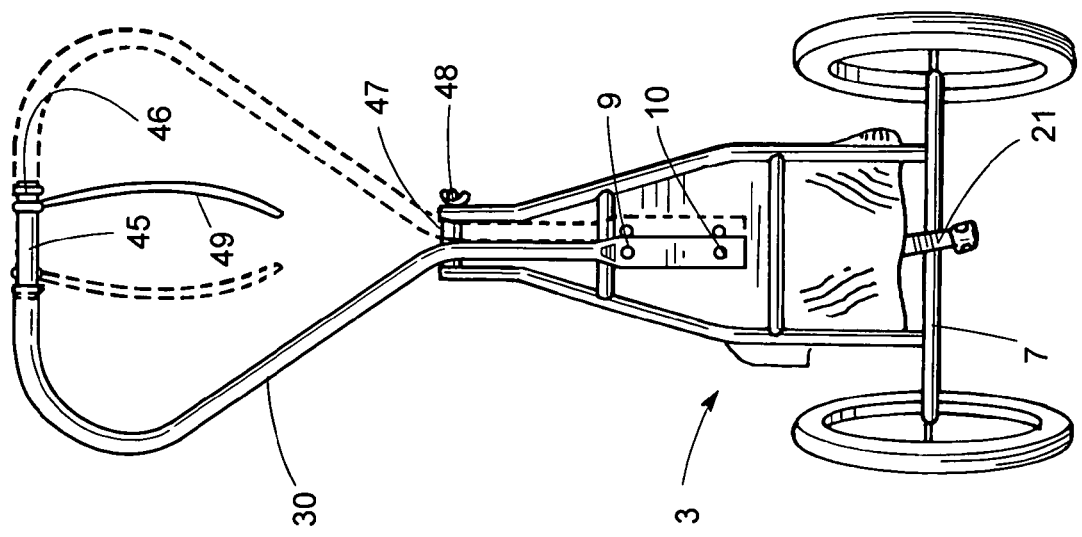

BICYCLE TRANSPORTER

REFERENCE TO RELATED APPLICATION

This is a continuation-in-part-application of the U.S. patent application having Ser. No. 10/104,435, filed Mar. 22, 2002, now U.S. Pat. No. 6,688,622.

BACKGROUND OF THE INVENTION

The improved bicycle transporter disclosed herein includes a novel bracket attachable to the rear axle of a baby-jogging cart for holding the front wheel of a towed bicycle. With this bracket, the bicycle transporter can be used to tow more than one bicycle at a time even if the bicycles are of different sizes. In a second improvement, the handle of the jogging cart has been was modified: it can now be opened allowing access to the towed bicycles' handlebars. Additionally, the handle grip has been made sufficiently flexible to facilitate cornering of towed bicycles and movement of their rear wheels over rough terrain. Increased stability on turns has also been provided by reducing the size of the wheels of the jogging cart so as to allow an adult-sized bike to be towed.

SUMMARY OF THE INVENTION

The object of this invention is to provide an apparatus for transporting at least one bicycle behind another bicycle. Such an apparatus is particularly useful for occasions in which one bicyclist wishes to travel a shorter distance or take only a one-way trip and her partner is willing to assume the responsibility for towing her bicycle for the rest of the trip. For example, an adult can use the apparatus to take children to school carrying their backpacks in a suitable passenger compartment and then return home, towing their empty bikes.

A further object of the present invention is to provide a pedal-powered bicycle transporter which can be used even if the child's bicycle has training wheels, thereby allowing it to serve for a long time as a tool to motivate both the adult and child to enjoy a fun exercise together.

In accordance with the present invention, the apparatus comprises a baby-jogging cart equipped with a special adapter which allows it to be used as a trailer behind a bicycle. With this combination, an adult can exercise with a child, while the child gains confidence and stamina with her own bicycle. Once the child becomes tired, she can rest in the jogging cart, or trailer, while the adult, using the present invention, continues his ride towing both her and her bicycle(s).

With the special adapter, a standard jogging cart can be towed behind a bicycle, with only a slight modification of the jogging cart and without modification to the towing bicycle. Rather, the special adapter includes a mounting bracket which, in use, is bolted or clamped onto the rear wheel support frame of the towing bicycle, near its rear axle. The mounting bracket comprises two meshing flange plates which are held in assembled relation by a single bolt having an enlarged nut. This nut is easily tightened without the use of tools.

Also included in the special adapter are a hitch pin mounted on one of the flange plates, a towing arm, and a flexible member for connecting the hitch pin thereto. The flexible member, which is preferably a short section of flexible hose, is held in place on the hitch pin by a clamp. In addition, a safety strap fastened to the towing arm is secured to the frame of the towing bicycle.

Distal from the towing bicycle, the towing arm is attached to the jogging cart from where its front wheel has been temporarily removed. Means for holding the towing arm and the jogging cart in assembled relation comprises a spacer, a first bolt which is insertable therein, a pair of second bolts which protrude downwardly from the undercarriage of the cart seat, and winged nuts for threadedly engaging the first and second bolts. The spacer accounts for the difference in width between the towing bar and the front wheel of the jogging cart. The winged nuts allow for ease of installation and removal.

In use, one bicycle is towed with its front wheel turned and lifted and placed forward of the jogging cart's rear axle and aft of its vertical supports. The front wheel then centers itself, due to its curvature, between the cart's wheels by resting on two frame members. In essence the cart's frame defines a wheel carrier. A special wheel carrier bracket attachable to the rear of the cart and necessary for towing even a single bike with many other trailer configurations is preferably adjustable in length to accommodate towed bicycles whose front wheels fall within a range of sizes. The handlebar of the towed bike is then strapped to the cart handle for vertical support and a second strap is used to hold its wheel next to the cart's rear axle.

For towing two or more bicycles, the special wheel carrier bracket is attached to the rear axle or back of the jogging cart. Means for temporarily securing the second bicycle to the rear of the cart includes first and second straps, the wheel carrier bracket and the cart's handle. The first strap confines the rim of the towed bike wheel within the wheel carrier bracket; the second strap limits the movement of the bicycle handle bars relative to the handle of the jogging cart.

With the front wheel of the towed bicycle so positioned, its steering post bearing facilitates turning movements. Also, the back wheel of the bicycle is free to move up or down so that it can roll easily over any roughness in the road. Further, the towed bike is free to lean as it goes around curves, shortening the turning radius.

The bicycle transporter according to the present invention can be used in combination with a wide variety of baby jogging cart models. Among these models are the Easy Strider (R) manufactured by Huffy (U.S. Pat. Nos. 5,029, 891, D315885) and a stroller/jogger from Instep (U.S. Pat. No. 5,029,891). Alternately, the bicycle transporter can be used in combination with currently marketed bicycle trailers and trail-a-bike designs.

BRIEF DESCRIPTION OF THE DRAWINGS

FIG. 8 is a bottom plan view of a fragmentary portion of the bicycle transporter according to FIG. 1, showing the towing arm in both the left hand (solid line) and the right hand (dashed line) towing position, as well as the undercarriage of the jogging cart to which the towing arm is attached;

FIG. 9 is a top plan view of two meshing flange plates which, when interlocked, comprise the mounting bracket in the bicycle transporter according to FIG. 1;

DETAILED DESCRIPTION OF THE PREFERRED EMBODIMENT

Figure 1:
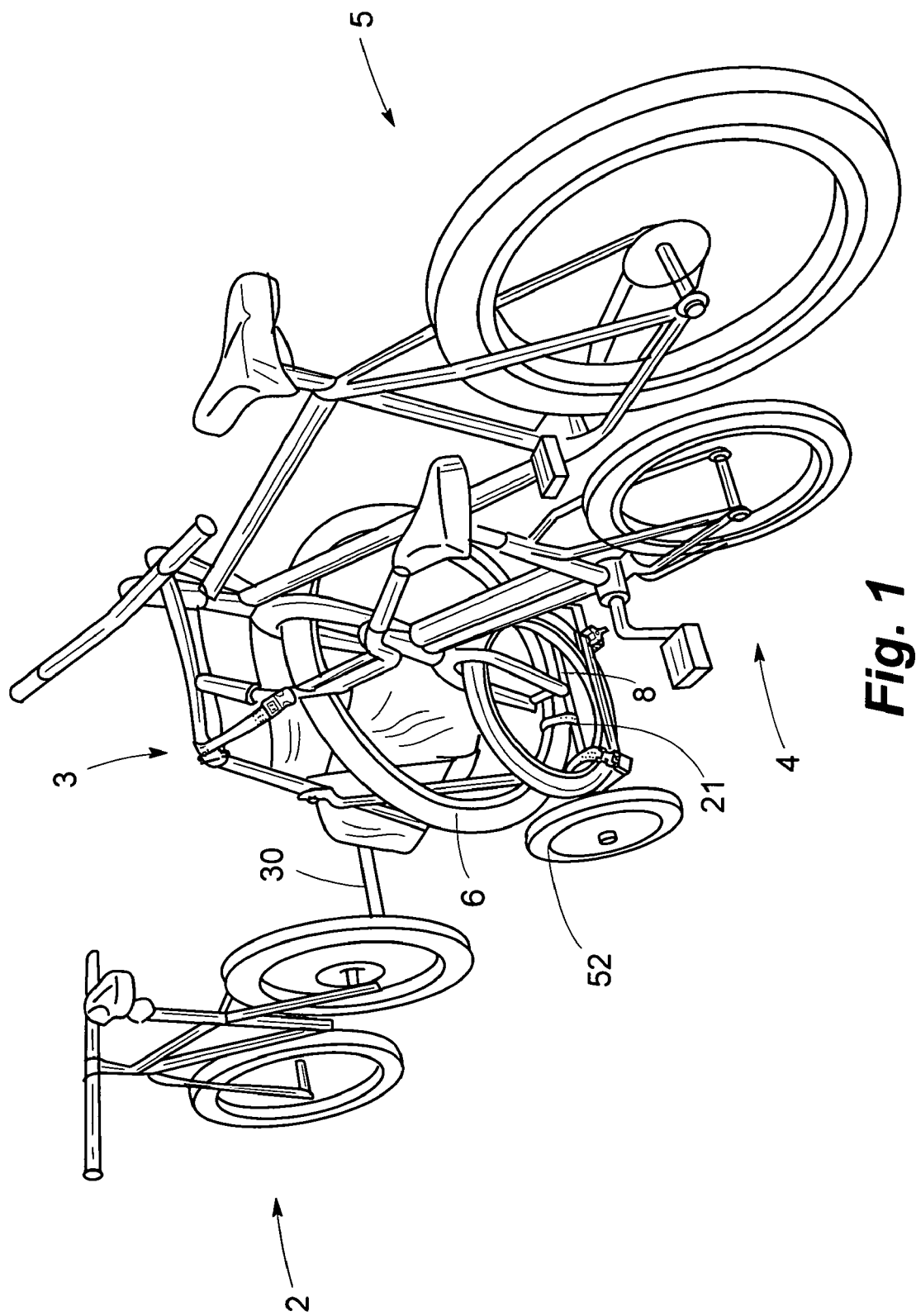
FIG. 1 is a perspective overview of the bicycle transporter according to the present invention, in use towing two bicycles of different sizes.

In the drawings, a bicycle transporter according to the present invention includes a towing arm 30 and a mounting bracket assembly. Distal ends of the towing arm 30 are connected to the rear wheel of a first bicycle 2 and to a baby jogging cart 3, on the rear of which is secured towed bicycles 4, 5 (FIG. 1).

Figure 11:
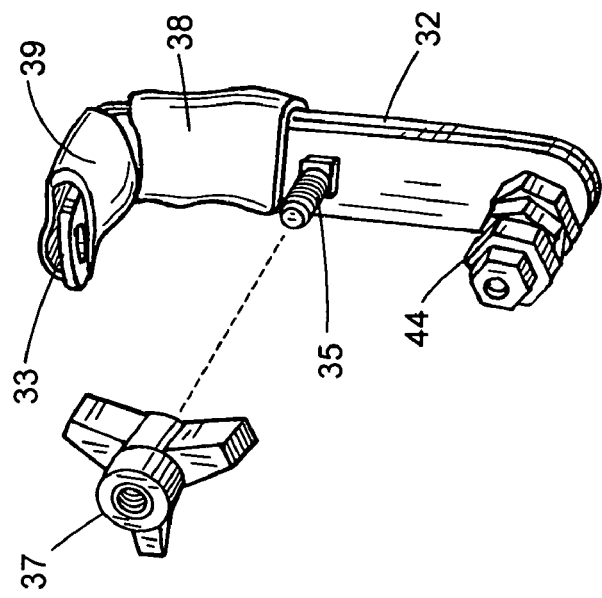
FIG. 11 is an exploded perspective view of the mounting bracket assembly, according to FIG. 10.
Figure 10:
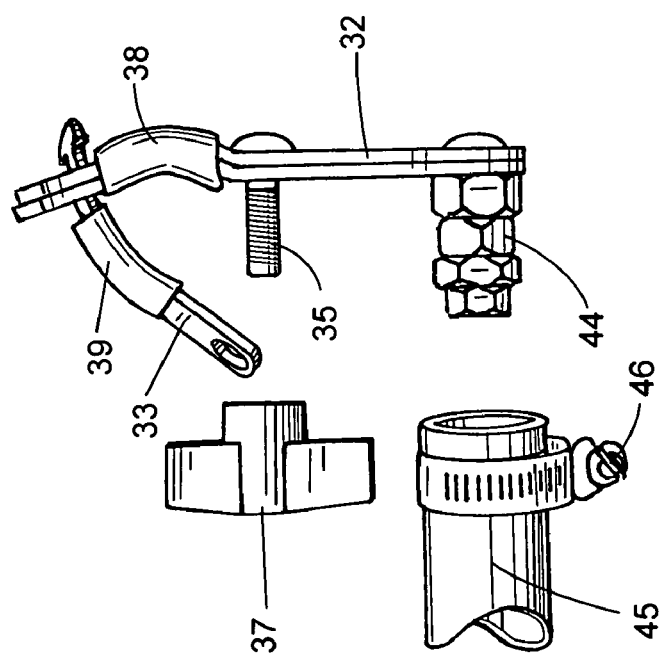
FIG. 10 is a exploded view of the mounting assembly and fragmentary portions of the flexible member in the bicycle transporter according to FIG. 1.

The mounting bracket assembly comprises two meshing flange plates 32, 33 which define central aperture 34 and end hole 36, respectively, and a hitch pin 44 (FIGS. 9, 10 and 11). The hitch pin 44 includes a bolt 35 which is held in place within an end aperture 40 defined by the longer flange plate 32 by a series of nuts and washers.

Figure 13:
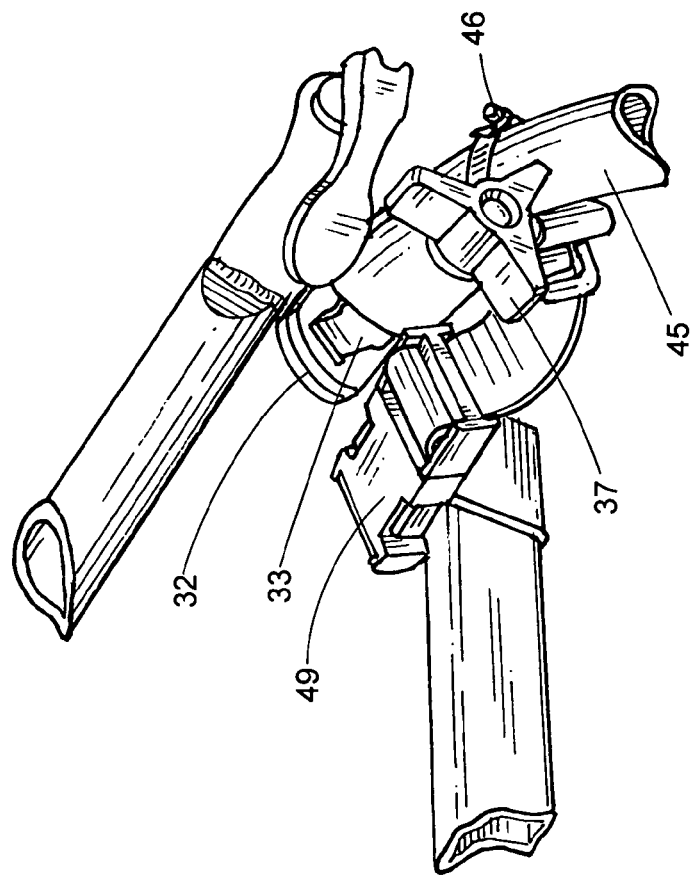
FIGS. 13 and 15 are perspective views of the mounting bracket assembly and a fragmentary portion of the flexible member in the bicycle transporter according to FIG. 1, the mounting bracket assembly being shown secured to the frame of the bicycle shown, as a fragment, in FIGS. 12 and 14, respectively.
Figure 12:
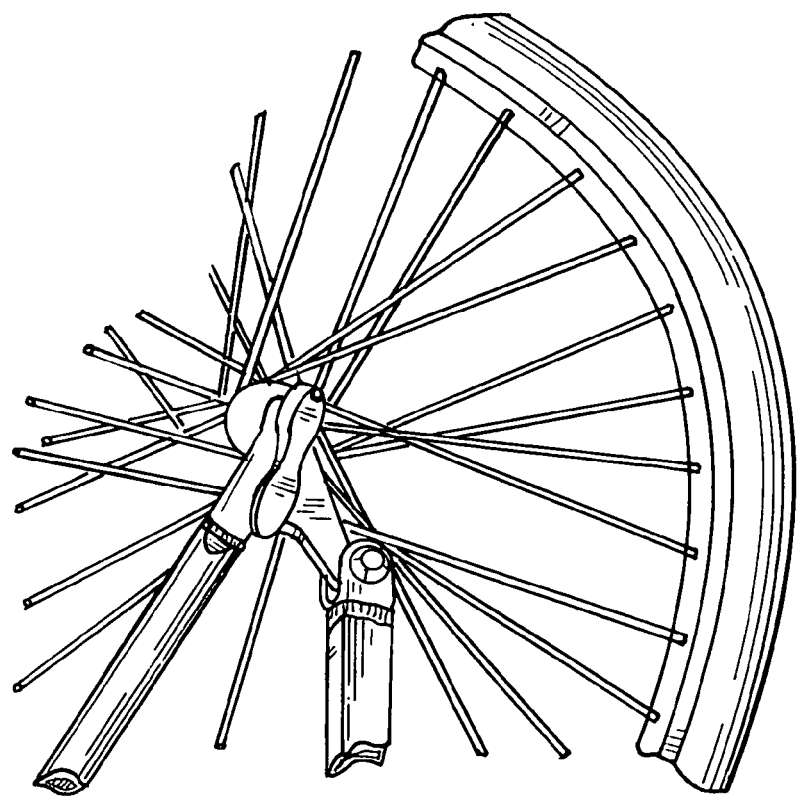
FIGS. 12 and 14 are side elevation views of a fragmentary portion of a bicycle having a quick disconnect rear wheel and a standard bolted-on rear wheel, respectively, on which the bicycle transporter (not shown) according to FIG. 1 can be mounted.
Figure 15:
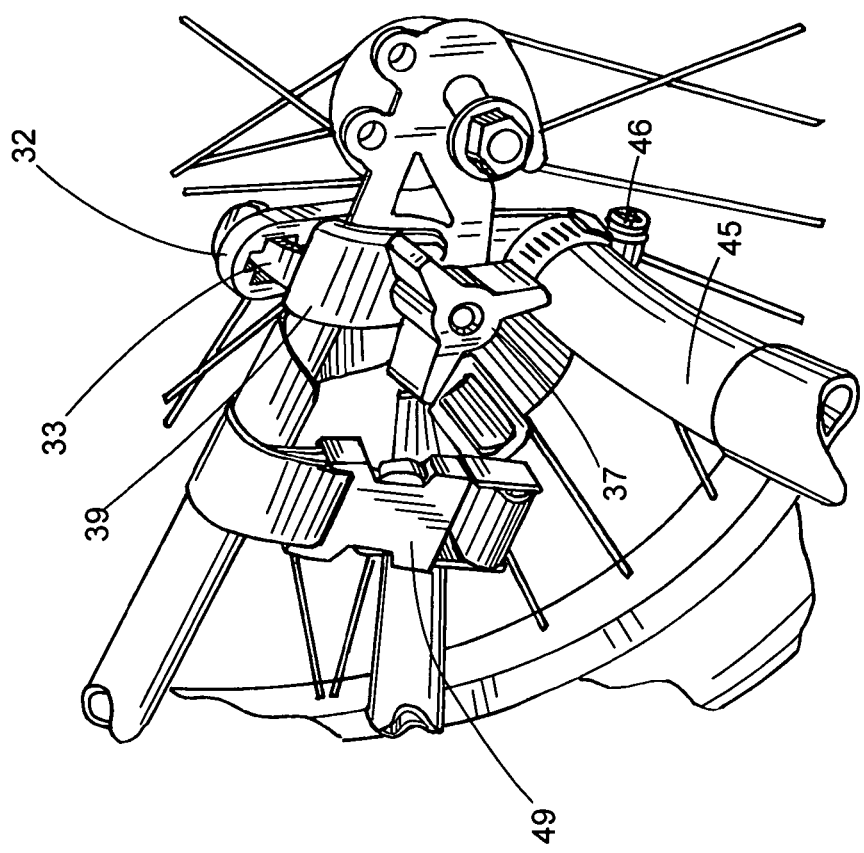
Figure 14:
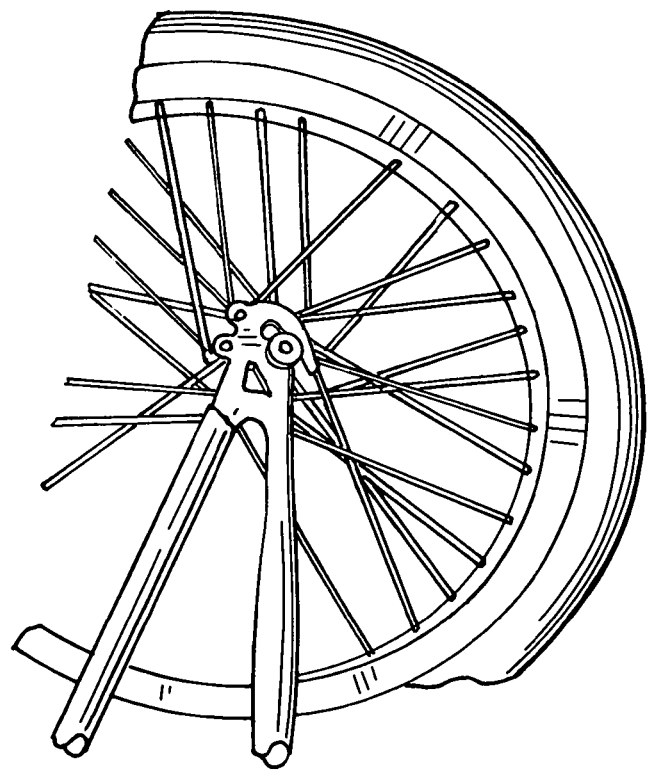

Once the flange plates 32, 33 have been coupled, they are installed on the first bicycle 2, which can have a quick disconnect rear wheel as shown prior to and post installation in FIGS. 12 and 13, respectively. Alternately, the meshing flange plates 32, 33 can be mounted on a bicycle having a standard bolted-on rear wheel (FIGS. 14 and 15).

To install the mounting bracket assembly, one positions longer flange plate 32, with the shorter plate 33 coupled thereto, inside the rear wheel support structure of the bicycle 2. Shorter flange plate 32 is then moved into such a position that bolt 35 can be simultaneously retained within center aperture 34 and inserted into end hole 36 (FIGS. 10, 11 and 9). Means for retaining the flange plates 32, 33 and bolt 35 in assembled relation, clamped to the rear wheel support structure, comprises a nut 37 having a large handle head. Preferably, the flange plates 32, 33 are also provided with pads 38, 39 to protect the finish on the bicycle frame (FIGS. 10, 11).

Figure 6:
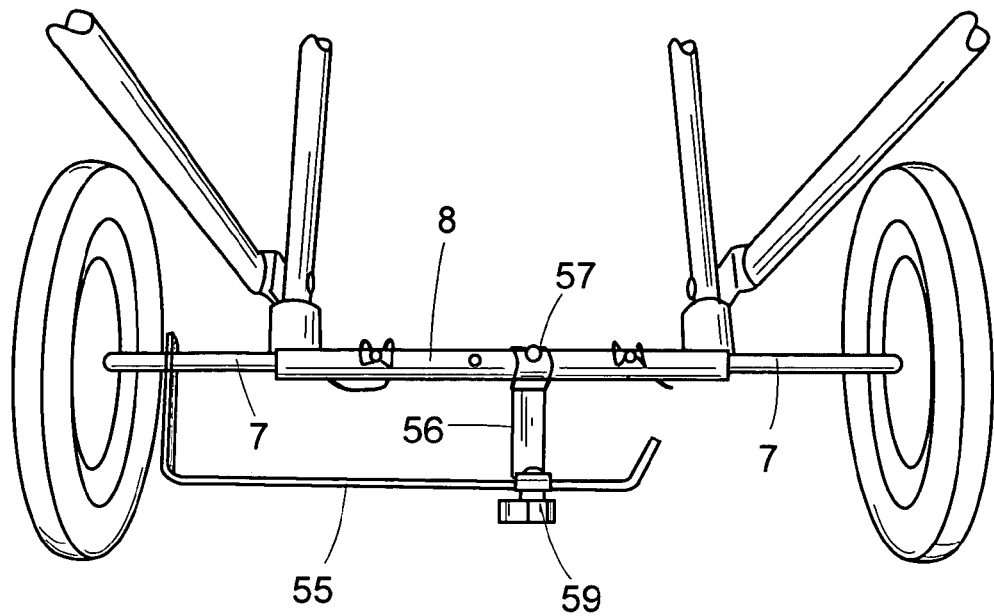
FIG. 6 is a top perspective view of the bicycle wheel carrier installed and fragmentary portions of the jogging cart.

Means for securing the towing arm 30 to the mounting bracket assembly comprises a flexible connector 45 attached at its distal ends to the hitch pin 44 and to the towing arm, respectively (FIGS. 10 and 8). A clamp 46 is used to hold the flexible connector 45 in place on the hitch pin 44 (FIGS. 6, 11, 13). In the preferred embodiment, the flexible connector 45 is a hose which measures, by way of example, 1 inch in diameter and 10 inches long. In addition, distal ends of a first safety strap 49 are attached to the towing arm 30 and to the rear wheel support structure (FIGS. 13 and 15).

Shaped roughly in the form of a large imaginary question mark, the towing arm 30 defines an arcuate front section which allows the towed jogging cart 3 to be centered behind the rear wheel of the towing bicycle 2 (FIG. 8). Rearwardly of the arcuate front section, the towing arm 30 is attached to the front wheel mount of the jogging cart 3 with a bolt, threadedly engageble with a wing nut 48, and a spacer 47 (FIG. 8). Means for attaching the towing arm 30 to the undercarriage of the baby jogging cart include two bolts which protrude downwardly therefrom and winged nuts 9, 10 for threadedly engaging them.

Figure 7:
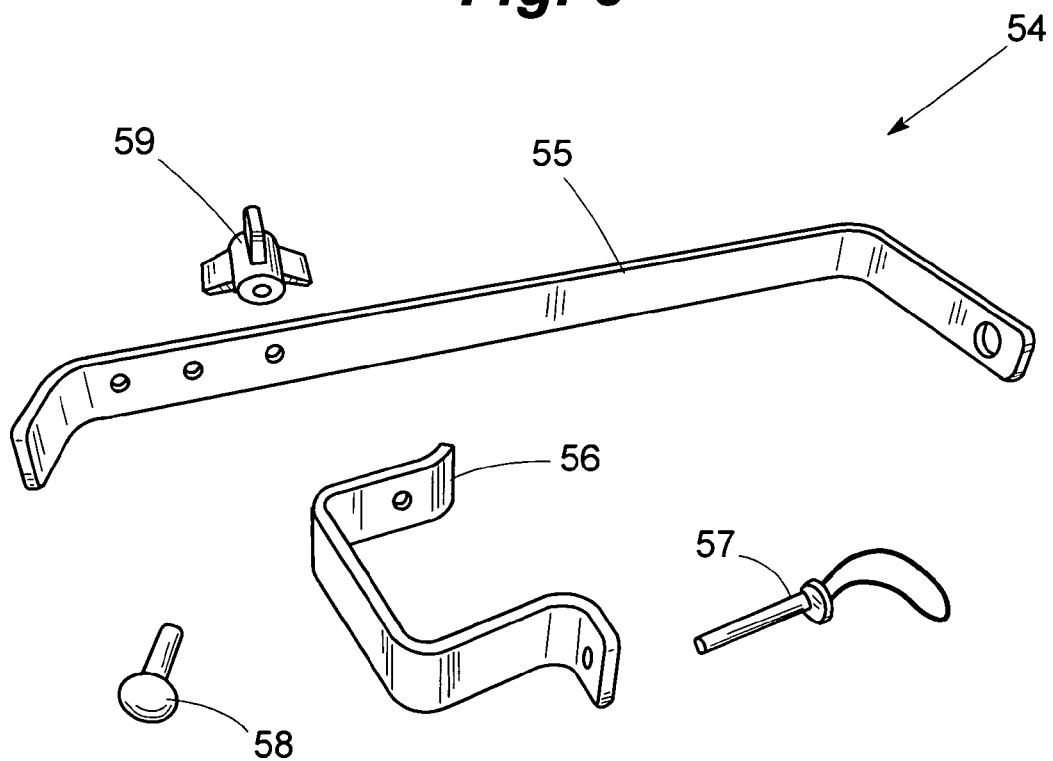
FIG. 7 is a perspective view of the disassembled parts of the bicycle wheel carrier.

The bicycle wheel carrier 54 includes an elongated bracket 55 and a short bracket 56 and fasteners 57, 58 and 59, as shown disassembled in FIG. 7. Installed on the axle 7 and axle support 8 of the jogging cart 3, as shown in FIG. 6, the transporter is now ready for receiving the towed bicycle 5.

Figure 3:
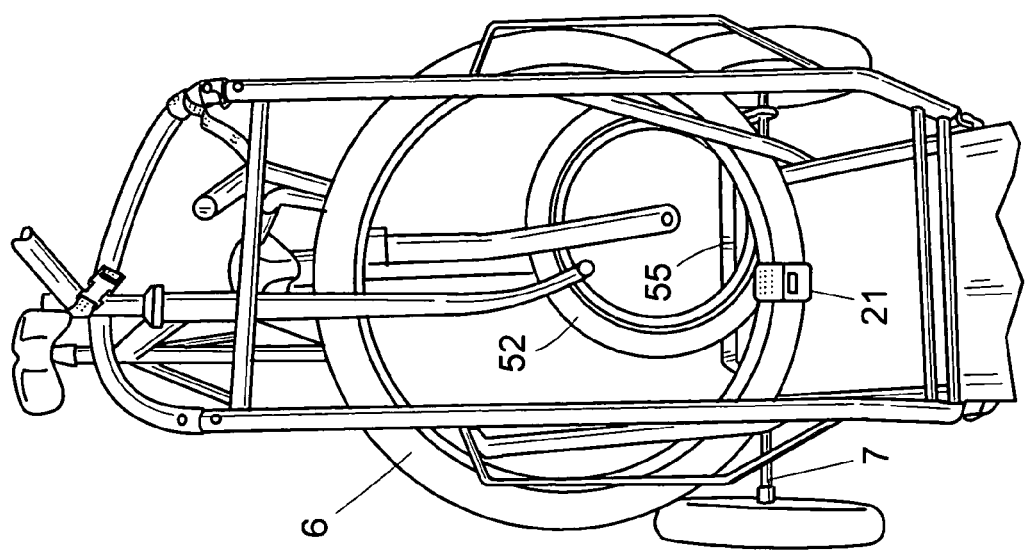
FIGS. 2 and 3 are side perspective and rearward perspective views, respectively, of the bicycle transporter according to FIG. 1, showing the smaller towed bicycle's wheel in the wheel carrier and fragmentary portions of a jogging cart and the larger towed bicycle mounted thereon.
Figure 2:
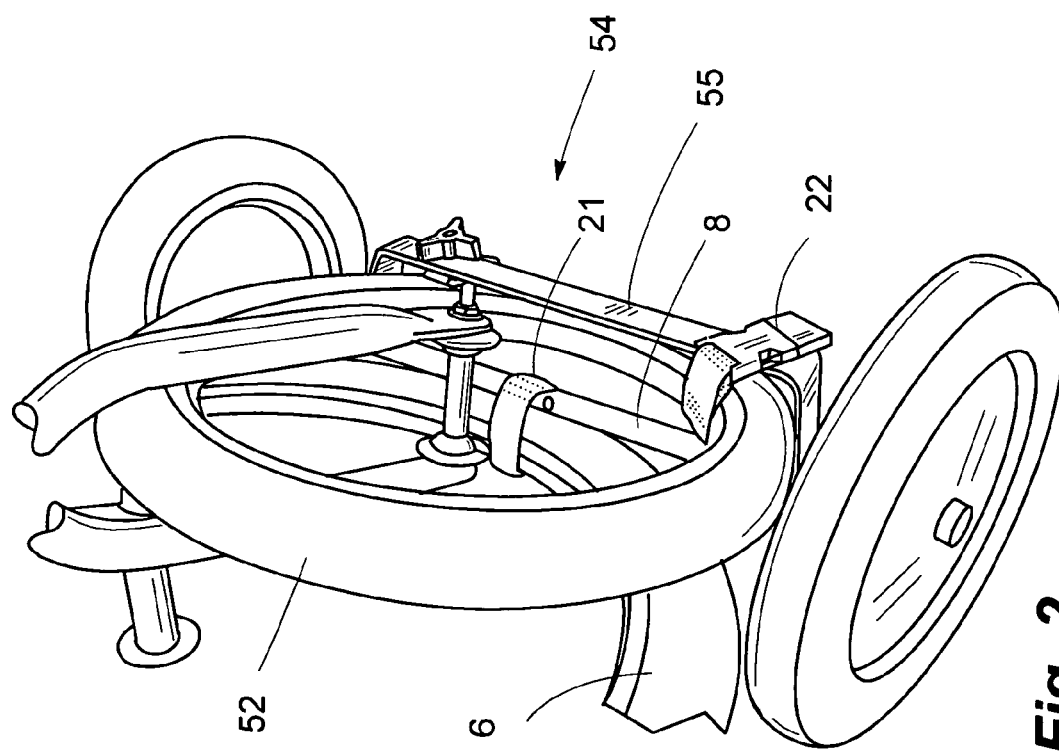
Figure 4:
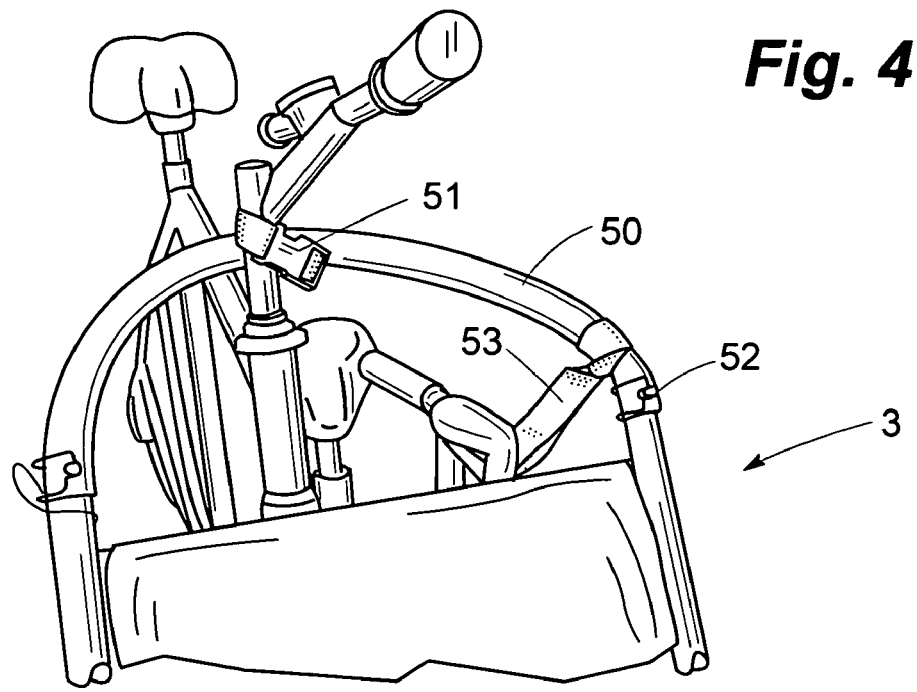
FIG. 4 is a top perspective view of the bicycle transporter according to FIG. 1, showing bicycle handlebars being attached to the jogging cart handle and fragmentary portions of the jogging cart and two towed bicycles mounted thereon.
Figure 5:
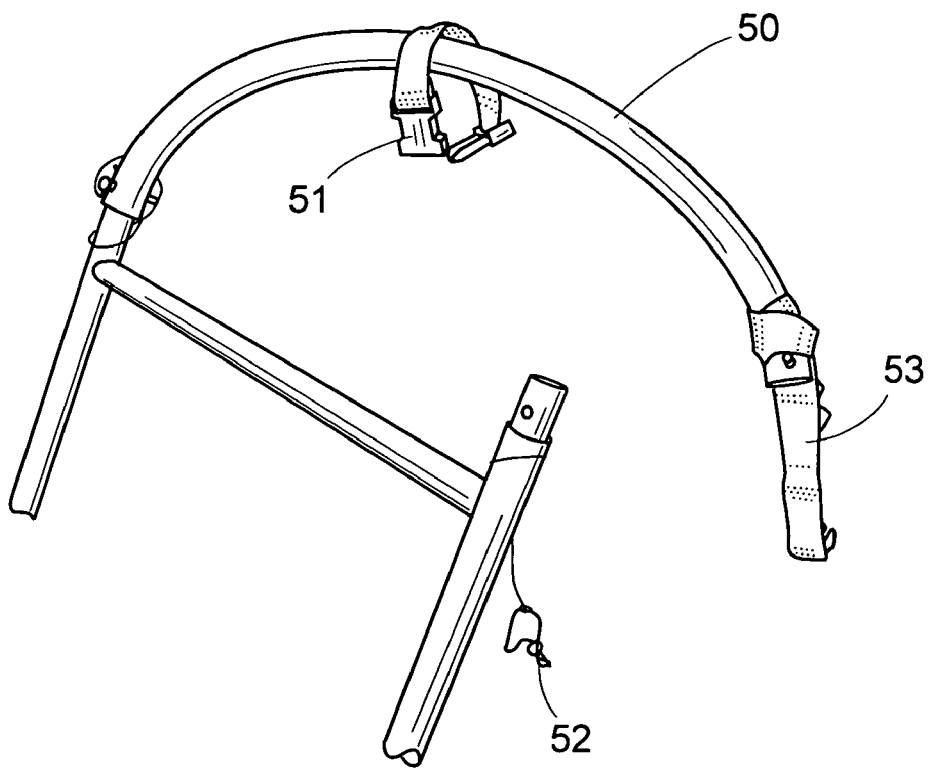
FIG. 5 is a perspective view of the bicycle transporter according to FIG. 1, showing the jogging cart handle in the open position ready for the bicycle's handlebar to be inserted, 0along with first and second straps used to secure the bicycles' handlebars and fragmentary portions of the jogging cart.

The procedure for securing the towed bicycles 4 and 5 to the rear of the jogging cart 3 is as follows: The front wheel 6 of the large bicycle 5 is turned approximately 90 degrees and placed in front of the cart's rear axle 7 (FIGS. 1, 2, 3). A quick opening strap 21 is then inserted through the spokes and secured around both the rim of the wheel 6 and the axle 7. Next the handle 50 of the jogging cart 3 is opened as shown in FIG. 5, the handlebar stem of bicycle 5 is placed under the handle 50 as shown in FIG. 4, and the handle 50 is closed using fastener 52. Then a band having quick opening and closure is wrapped around the handlebar stem which keeps the bicycle 5 in a vertically normally upright position. Next the smaller bicycle 4 has its front wheel 52 turned 90 degrees and placed in the bicycle wheel carrier 54. Strap 22 is used to fasten the wheel 52 into the wheel carrier 54. A strap 53 is then fastened around the handlebar of the bicycle 4 and the cart's handle 50. The two bikes are now disposed in generally vertical positions and are ready to be towed. The towed bicycles 4, 5 can be mounted on or removed from the transporter in an interval of less than one minute.

In operation, the bicycle transporter according to the present invention allows the bicyclist to tow the jogging cart 3 and bicycles 4, 5 in tandem or individually, even over rough roads and curbs. With its mechanism for mounting the towed bicycle(s) 4 and 5, the bike transporter can be utilized even while a child reclines in the seat of the baby jogging cart 3 and her bicycle 4 or 5 is being towed.

It is understood that those skilled in the art may conceive other applications, modifications and/or changes in the invention described above. Any such applications, modifications or changes which fall within the purview of the description are intended to be illustrative and not intended to be limitative. The scope of the invention is limited only by the scope of the claims appended hereto.

It is claimed:

1. An apparatus for towing at least one bicycle with a first bicycle, the first bicycle having a rear wheel support structure, comprising:

(a) a cart having at least one frame member;

(b) a towing means, including a bracket assembly and a towing arm, for pulling the cart behind the first bicycle, the bracket assembly being removably mounted on the rear wheel support structure of the first bicycle, the towing arm being connected to the bracket assembly, an elongated section of the towing arm proximate with the bracket assembly being aligned parallel with the rotational axis of the rear wheel of the first bicycle, the towing arm extending rearwardly from the first bicycle and being fastened to the frame member; and (c) means for removably attaching a second bicycle to the rear of the cart.

2. The apparatus according to claim 1 in which the bracket assembly further comprises two flange plates which are movably coupled together and means, including a bolt and nut for threadedly engaging the bolt, for holding the flange plates in assembled relation when they are clamped around a portion of the rear wheel support structure.

3. The apparatus according to claim 1 which further comprises a flexible connector for connecting the towing arm to the bracket assembly, the flexible connector being disposed downwardly of the lowest point on the rear wheel support structure.

4. The apparatus according to claim 1, which further comprises means, including a wheel carrier bracket attached to the cart, for towing a third bicycle, the bracket holding the front wheel of the third bicycle during towing.

5. An apparatus for towing at least one bicycle with a first bicycle, the first bicycle having a rear wheel support structure, comprising:

(a) a cart having at least one frame member, a rear axle, and a handle;

(b) a towing means, including a bracket assembly and a towing arm, for pulling the cart behind the first bicycle, the bracket assembly being removably mounted on the rear wheel support structure of the first bicycle, the towing arm being connected to the bracket assembly, the towing arm extending rearwardly from the first bicycle and being fastened to the frame member of the cart; and (c) means, including at least one first flexible strap for holding the front wheel of a second bicycle near the rear axle of the cart, at least one second flexible strap for attaching the handlebar of the second bicycle to the handle of the cart, and a wheel carrier which is supported by the rear axle of the cart, for towing a second bicycle with its front wheel held in a position in which it is turned at an angle of approximately 90 degrees, the wheel carrier holding the front wheel of the second bicycle when it is so turned.

6. An apparatus for towing at least one bicycle with a first bicycle, the first bicycle having a rear wheel support structure, comprising:

(a) a cart having a handle, a rear axle, and front wheel support forks; the cart having its front wheel removed;

(b) a towing means, including a bracket assembly and a towing arm, for pulling the cart behind the first bicycle, the bracket assembly being removably mounted on the rear wheel support structure of the first bicycle, the towing arm being connected to the bracket assembly, the towing arm extending rearwardly from the first bicycle and being fastened to the front wheel support forks of the cart; and (c) means, including the handle having an elongated hand grip and a rigid frame, at least one first flexible strap for holding the front wheel of a second bicycle near the rear axle and at least one second flexible strap for attaching the handlebar of the second bicycle to the handle of the cart, for towing the second bicycle with its front wheel held in a position in which it is turned at an angle of approximately 90 degrees; the rigid frame terminating upwardly in spaced apart first and second frame members, distal ends of the hand grip being attached to the frame members in such a way that, in use, the hand grip and frame members define an inverted, generally U-shaped structure for receiving the handlebar of the second bicycle when the handlebar is attached to the handle with the second flexible strap, one end of the hand grip being removably attached to the first frame member, so that said removably attached end can be temporarily separated from the first frame member, thereby forming an opening through which the handlebar of the second bicycle can be passed prior to use.

7. The apparatus according to claim 6 wherein the hand grip is further characterized as being sufficiently flexible to facilitate cornering of the second bicycle.

8. An apparatus for towing second and third bicycles with a first bicycle, comprising:

(a) a cart having a rear axle:

(b) means for pulling the cart behind the first bicycle;

(c) means for towing the second bicycle with its front wheel held in a position in which it is turned at an angle of approximately 90 degrees and held near the rear axle of the cart; and (d) means, including a wheel carrier bracket attached to the cart, for towing the third bicycle, the wheel carrier bracket holding the front wheel of the third bicycle in such a way that, during towing, its front wheel is disposed generally at an acute angle to the longitudinal centerline of its frame and its rear wheel is free to ride on the road behind the cart.

* * * * *